Sept. 19, 1939.  R. L. KOZELKA ET AL  2,173,278
CUTTING MACHINE
Filed Sept. 30, 1937
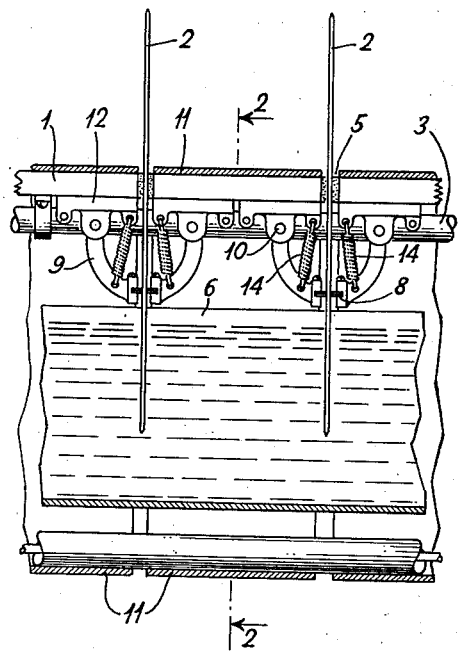
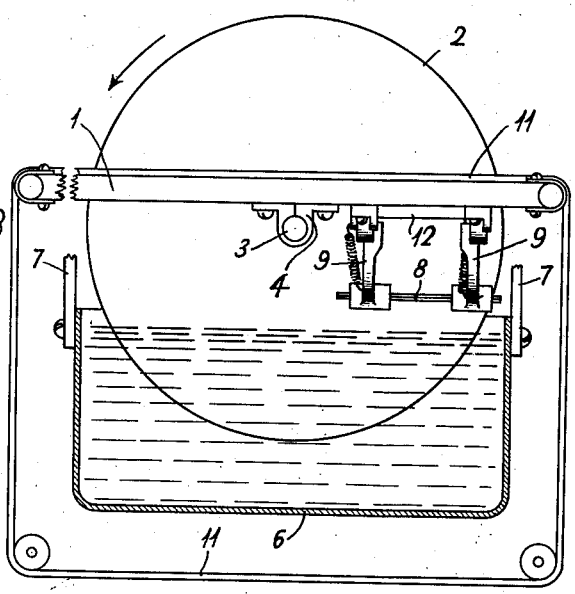
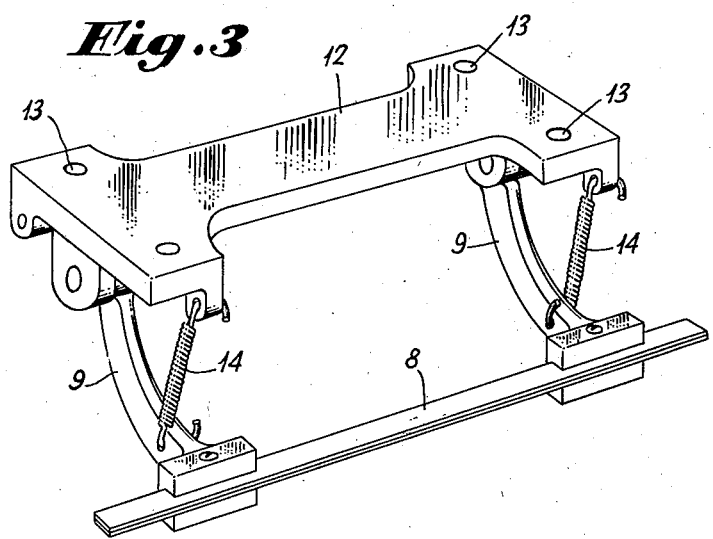
INVENTORS
RUDOLF LUDWIG KOZELKA
DIETRICH RICHARD KARL VON HOLLEN
BY
ATTORNEY Patented Sept. 19, 1939

2,173,278

UNITED STATES PATENT OFFICE 2,173,278

CUTTING MACHINE

Rudolf Ludwig Kozelka, East Elmhurst, and Dietrich Richard Karl von Hollen, Rego Park, N. Y.

Application September 30, 1937, Serial No. 166,510

2 Claims. (Cl. 146—98)

The present invention relates to improvements in machines for cutting or slicing cake, pastry and other baked products, or products of soft texture.

One object of our invention is to provide such cutting machines with one or more circular knives which will cleanly cut cake or other baked products and be specially adapted for cutting cake composed of layers of different colors or ingredients.

Another object of our invention is to provide a novel means for cleaning said circular knives after each cutting cycle to completely remove therefrom any traces of the product being cut.

An additional object is to provide said circular knife or knives with a critical amount of moisture.

A still further object of our invention is to provide a wiping means for a circular knife or knives which will be fully effective in the presence of irregularities in the surface of said knives.

An additional object is to provide a multiplicity of such circular knives in one assembly for simultaneous operation upon the product to be cut.

So far as we are aware, it has been the practice in the past to cut cake and other baked products either by means of reciprocating knives or by means of saws either of the circular or band type. Where reciprocating knives are used for cutting, the operation is effected mostly as a result of the downward pressure of the knife upon the product to be cut. This results in an undesirable compression of the product which destroys the cellular structure thereof in the vicinity of the cut. Cutting means of the circular or band type provided with saw edges are objectionable in that they cut as the result of a tearing action. Such tearing action isolates small fragments of the product being cut and deposits them in removed locations on the cut surface. This is particularly undesirable where layers of different colors or ingredients are being cut. It is generally true in the use of cutters of this type that where raisin cake of soft texture is being cut, the raisins in the path of the cutter are torn out whole because of the greater resistance they offer to the saw edge compared with the texture of the cake.

An additional disadvantage in prior art machines for cutting cake and other baked products, resides in the lack of suitable means for providing the side surfaces of the cutter with a critical amount of moisture so as to reduce to a minimum the tendency of particles of the cut product to adhere thereto. It has been customary in the past to apply moisture to the cutter by causing water to drip thereon. However, this is objectionable in that it is impossible to regulate the dripping action so as to assure the presence of just the right amount of moisture for a clean cut. Furthermore, the moisture under this practice is of such small amount as to be negligible in aiding the cleaning operation. We are of course aware of the use of a water bath for cutters designed for cutting wet or moist stock, such as tobacco or ice cream, but here the problem of removing excess moisture from the cutter subsequent to passage through the bath is not serious, since such stock is already moist. In the cutting of cake or bread, however, where the stock is dry, or where layers of cake having a soft filling are cut, the necessity for removing all but a critical amount of moisture from the cutter after passing through the water bath, is important. In baked products excess moisture is objectionable in that it destroys the cellular structure of such products and tends to reduce the cut edges thereof to a doughy paste.

A further disadvantage in prior art cutting machines of the character here discussed, resides in the inefficiency of the wiping means. Such wiping means usually comprises a felt material and is caused to contact the side surfaces of the cutter under a definite pressure. This pressure is independent of the speed of the cutter and of the amount of moisture applied thereto. Any increase or decrease beyond a narrow margin in the speed of the cutter past the cutting point or in the amount of water applied thereto, will render the operation of the machine wholly unsatisfactory.

The present invention overcomes all these drawbacks of prior art devices. It provides for a cutting machine for cake and allied products which includes one or more circular knives, a tray of water adapted to immerse said knives, and wipers for said knives which comprise a wiper body of resilient material mounted adjacent each side of said knife or knives upon an arm pivoted at a point away from said side of the knife or knives so as to form an angle with respect to said side, this pivotal point being in the direction of rotation of said knives.

The disposition of said arm at an angle with respect to the side surfaces of said knives and the pivoting thereof at a point in the direction of rotation of said knives results in the exertion of a pressure of the wiper upon the side of the knife when the latter is rotated. This pressure varies directly with variations in speed of rotation of the knife. This fact is significant in connection with the water bath through which the knife is caused to pass. With increase in speed of rotation of the knife through the bath there will be an increase in the amount of water taken up by the knife as the result of the capillary action of the water. However, an increase in rotational speed of the knife, in addition to increasing the capillary effect of the water, will also increase the pressure of the wiper upon the sides of the knife. This increased pressure will have the effect of increasing the action of the wiper upon the water, adhering to the sides of the knives from the bath. Within certain limits, therefore, which are considerably broader than are permitted by the prior art, our invention assures the presence of a critical moisture upon the knives of the cutter. These limits are determined by the speed of rotation of the knives and the angle at which the wiper arm is mounted with respect to the side surfaces of the knife. We have found these limits to be a rotational speed of knife of appreciably more or less than 100 revolutions per minute and an angular disposition of the wiper arm of appreciably more or less than 45° with respect to the side surfaces of the knives.

The relationship between the speed of rotation of the knives and pressure of the wiper against the sides thereof is also of particular value in cleaning the particles of cut product from the knives. With increase in speed of rotation there will adhere to the knife surface a greater amount of such particles which will require stronger wiper action to remove. This stronger wiping action automatically occurs according to our invention as a result of the increase in speed of rotation. Consequently the speed of rotation of the knives which determines the amount of matter and water adhering to the knives also determines the wiping action of the wiper.

Our invention will be described in greater particularity by reference to the accompanying drawing in which like characters of reference describe like parts, and where Fig. 1 shows a front sectional view of a cutter employing our invention, Fig. 2 shows a side section of the cutter of Fig. 1 along the line 2—2

Fig. 3 is a detail view of the wiper of our invention.

Referring to Fig. 1, there is shown at 1, a table upon which our machine is mounted. The cutters 2, illustrated as of circular shape are mounted upon shaft 3 which in turn is supported by bearings 4 fastened to the under side of the table 1. Table 1 is provided with slots 5 to permit knives 2 to enter upwardly from the top surface of the table into the path of movement of the material to be cut. The knives 2 enter downwardly into a basin 6 of water which is suitably supported from the table as at 7. Pivoted to the underside of table 1 is a cleaning means comprising a wiper body 8 of resilient material mounted on arms which in turn are pivoted to table 1 at 10. Between the knives 2 are conveyor belts 11 which are suitably entrained on rollers not shown.

In Fig. 2, is shown the two arms 9 on which the wiper body is mounted. The wiper 8, is positioned substantially at right angle to the direction of rotation of the cutter 2 and parallel to the surface of table 1. The entire cleaning structure is positioned to one side of the center of cutter 2 and contacts not more than a radius of said cutter. It is mounted on that side of the center of cutter 2 whose direction of rotation is upward.

Fig. 3 shows the wiper mechanism of our invention in detail. The curved arm 9 is shown as pivoted to a crossbar 12, which is fastened to the underside of table 1 through screw holes 13. Coil springs 14 urge the wiper 8 into contact with side surface of cutter 2. The tension of said spring 14 is just sufficient to cause the wiper body 8 to contact the cutter surface.

Figs. 1 and 3 show the angular disposition of arms 9 with respect to the side surface of cutter 2. The pivotal point 10 is positioned away from the side surface of cutter 2 so that the angle of said arms 9 is substantially 45° with respect to said cutter surface. Said pivotal point lies in the direction of rotation of the cutter 2.

Our invention operates as follows: The material to be cut is conveyed by conveyors 11 from the left in Fig. 2 against knife 2. The cutting edge of knife 2 moves in a downward direction as shown by the arrow. After a particular section of the cutting edge has passed through the stock to be cut, it passes through a bath of water contained in tray 6. The tray contains sufficient water to immerse substantially the entire lower portion of knife 2. As rotation of the knife continues, the surface thereof subjected to the bath passes wipers 8 one of which is disposed at each side of the knife. The action of the wiper is such as to become stronger in action with increase in the speed of rotation of knife 2. This is because of the pivoting of the arms 9 at an angle with respect to the sides of the knives and in the direction of rotation of said knives. Thus we have found that when the knife 2 is rotated at a speed of 100 revolutions per minute, the action of the wiper will produce best results if the angle between the arms 9 thereof and the surface of knife 2 is about 45°. However, if the speed of rotation should vary within what may be considered appreciable limits, the wiper will still operate satisfactorily, because of the interrelation of rotary speed of knife 2 and pressure thereupon by wiper 2 existing by virtue of novel structure of our wiping means.

It will be apparent that many modifications may be made in our invention without departing from its spirit, and we desire to include them within the scope of our claims.

What we claim and desire to secure by Letters Patent is:

1. In a machine for cutting baked products composed of layers of different colors and/or ingredients into two or more parts wherein circular cutting knives and a bath of water for said knives are provided, a table structure for supporting the product to be cut, said cutting knives extending below and above said table structure, a receptacle of water supported below said table structure adapted to receive a portion of said knives, a wiping mechanism comprising a wiper body of resilient material having a rectangular cross section and being mounted on an arm a thin edge of said wiper element being in square abutment to a side surface of said knives and extending parallel to a radius thereof, said arm being pivoted to the underside of said table structure away from the side surface of said knives and extending downwardly towards said knife surfaces, means for urging said wiper body into a substantially pressureless contact with said knife surfaces, said wiper mechanism being mounted to one side of the center of said knives to engage an upwardly moving radius thereof.

2. A machine for cutting soft bodied products into two or more parts including circular cutting knives, a water bath therefor and a scraper for cleaning the side surfaces of the knives and removing all but a critical amount of moisture therefrom, characterized by means for rotating said knives in a vertical plane at a rate of speed of from 80 to 120 revolutions per minute, a support for the product to be cut adjacent the downwardly moving edge of said knives, a water bath adapted to immerse the lower portion of said knives, and wipers engaging a substantially horizontal radius of the knife surface at a point thereof moving upwardly from said bath, said wiper comprising a wiper element of resilient material of rectangular cross section, and a support therefor including a grooved member adapted to hold said wiper element, said grooved member being mounted at one end of an arm with the groove facing the knife surface, the other end of said arm being pivotally mounted at a point projected from the side of the knife and in the direction of rotation thereof from said wiper element, said arm extending in a direction from said pivotal point towards said knife surface of substantially 45 degrees with respect to said knife surface, and means for urging said wiper element into a substantially pressureless contact with said knife surface.

RUDOLF LUDWIG KOZELKA.
DIETRICH RICHARD KARL von HOLLEN.